US010690765B2

(12) United States Patent
Casagrande et al.

(10) Patent No.: US 10,690,765 B2
(45) Date of Patent: Jun. 23, 2020

(54) PROCESS AND SYSTEM FOR DETERMINING A DISTANCE BETWEEN A WEARABLE OBJECT AND A BASE STATION

(71) Applicant: The Swatch Group Research and Development Ltd, Marin (CH)

(72) Inventors: Arnaud Casagrande, Bole (CH); Carlos Velasquez, Neuchatel (CH); Philippe Duc, Avenches (CH)

(73) Assignee: The Swatch Group Research and Development Ltd, Marin (CH)

( * ) Notice: Subject to any disclaimer, the term of this patent is extended or adjusted under 35 U.S.C. 154(b) by 260 days.

(21) Appl. No.: 15/710,238

(22) Filed: Sep. 20, 2017

(65) Prior Publication Data

US 2018/0095172 A1    Apr. 5, 2018

(30) Foreign Application Priority Data

Sep. 30, 2016    (EP) .................................. 16191813

(51) Int. Cl.
*G01S 13/87*    (2006.01)
*H04K 1/02*    (2006.01)
(Continued)

(52) U.S. Cl.
CPC ........ *G01S 13/878* (2013.01); *A63B 24/0021* (2013.01); *G01S 13/825* (2013.01);
(Continued)

(58) Field of Classification Search
CPC ...... G01S 13/878; G01S 13/825; G01S 13/84; G01S 2007/356; G01S 13/87
(Continued)

(56) References Cited

U.S. PATENT DOCUMENTS 7,119,736 B2    10/2006 Heide et al.
9,514,342 B1 *    12/2016 Hosseini ................. G06F 1/163
(Continued)

FOREIGN PATENT DOCUMENTS

| EP | 2 796 988 A1 | 10/2014 |
|---|---|---|
| EP | 2 796 988 B1 | 9/2015 |
| WO | WO 2015/152809 A1 | 10/2015 |

OTHER PUBLICATIONS

On IEEE 802.11: Wireless Lan Technology, Sourangsu Banerji, IJMNCT, vol. 3, Issue. 4, 2013 (Year: 2013).*
(Continued)

*Primary Examiner* — Vladimir Magloire
*Assistant Examiner* — Michael W Justice
(74) *Attorney, Agent, or Firm* — Oblon, McClelland, Maier & Neustadt, L.L.P.

(57) ABSTRACT

For the process for determining a distance, there is provided a succession of coded signals at high frequency transmitted between a base station and a wearable object. A preparation of a response signal is conducted in the wearable object on reception of the first synchronisation signal after activation of the wearable object. A transmission of successive coded signals at high frequency from the wearable object is conducted for the station, of which the last response signal is scrambled by a modulation of data on the last signal received at a high transfer rate from the station. An analysis is conducted in a processing unit of the base station after reception of the signals from the wearable object to accurately determine the distance separating the base station from the recognised wearable object.

25 Claims, 6 Drawing Sheets

(51) Int. Cl.
  *A63B 24/00* (2006.01)
  *H04K 1/00* (2006.01)
  *G01S 13/82* (2006.01)
  *G01S 13/84* (2006.01)
  *G01S 7/35* (2006.01)

(52) U.S. Cl.
  CPC ............ *G01S 13/84* (2013.01); *H04K 1/00* (2013.01); *H04K 1/02* (2013.01); *G01S 2007/356* (2013.01)

(58) Field of Classification Search
  USPC .......................................... 342/125
  See application file for complete search history.

(56) References Cited

U.S. PATENT DOCUMENTS

| | | | |
|---|---|---|---|
| 2005/0012653 A1 | 1/2005 | Heide et al. | |
| 2006/0273952 A1* | 12/2006 | Krikorian | G01S 7/038 342/198 |
| 2007/0222503 A1* | 9/2007 | Murofushi | H04K 25/061 329/304 |
| 2011/0221632 A1 | 9/2011 | Fretenburg et al. | |
| 2011/0273334 A1* | 11/2011 | Karr | G01S 13/825 342/378 |
| 2012/0133558 A1 | 5/2012 | Fretenburg et al. | |
| 2012/0146834 A1* | 6/2012 | Karr | G01S 13/325 342/47 |
| 2014/0324934 A1 | 10/2014 | Hrdy et al. | |
| 2016/0234684 A1 | 8/2016 | Hekstra et al. | |
| 2016/0277196 A1* | 9/2016 | Jose | H04L 12/18 |

OTHER PUBLICATIONS

European Search Report dated Mar. 10, 2017 in European Application 16191813.1, filed on Sep. 30, 2016 (with English Translation of Categories of cited documents).

* cited by examiner

PROCESS AND SYSTEM FOR DETERMINING A DISTANCE BETWEEN A WEARABLE OBJECT AND A BASE STATION

This application claims priority from European Patent Application No. 16191813.1 filed on Sep. 30, 2016, the entire disclosure of which is hereby incorporated herein by reference.

FIELD OF THE INVENTION

The invention relates to a process for determining a distance between at least one personalised wearable object and at least one base station.

The invention relates to a system for determining a distance for implementation of the process for determining a distance.

BACKGROUND OF THE INVENTION

It is common in the field of sport, for example, to define the times of competitors on a race track by means of a wearable object, which can be a transponder module that is permanently activated or is woken by an activation signal associated with a base station. However, it is always difficult to accurately determine the distance separating said transponder module worn by a competitor and the base station in order to know his/her position on a race track before the finish.

Patent application WO 2015/152809 A1, which describes a position detection process and system, can be cited in this regard. The position detection system comprises at least one transponder module and a base station. The base station transmits a pseudo-random code signal for the transponder module. This pseudo-random code signal is delayed by a number of clock pulses in the transponder module, which retransmits a pseudo-random code signal taking into account the generated delay in order to enable the base station to determine the flight time of the pseudo-random code signal between the two entities. However, it is not provided to transmit multiple coded signals continuously from the base station to the transponder module in order to accurately determine a distance between the transponder module and the base station, nor is the possibility of easily recognising the interrogated transponder module, which constitutes a disadvantage.

SUMMARY OF THE INVENTION

Therefore, the aim of the invention is to propose a process for determining a distance between at least one personalised wearable object and at least one base station to remedy the disadvantages of the abovementioned prior art without complex calculation in the wearable object during the transmission of its response signal.

For this purpose, the invention relates to a process for determining a distance between at least one personalised wearable object and at least one base station by a wireless signal communication, wherein the base station comprises a transmitter of radiofrequency signals at high frequency, a receiver of radiofrequency signals at high frequency, a processing unit and a local oscillator for clocking the operations of the base station, and the wearable object comprises a transmitter of radiofrequency signals at high frequency, a receiver of radiofrequency signals at high frequency, a logic unit and a local oscillator for clocking the operations of the wearable object, wherein the process comprises the steps of:
according to a first step, activating the wearable object,
according to a second step, transmitting a first synchronisation signal from the base station, and receiving the first synchronisation signal from the base station in the wearable object to synchronise an additional modulation of the data particular to the wearable object in a subsequent response signal,
according to a third step, transmitting a second coded signal from the base station, receiving the second coded signal from the base station in the wearable object and retransmitting the received second coded signal to the base station, and receiving the retransmitted second coded signal from the wearable object in the base station in order to be converted and stored in a first memory register of the digital processing unit,
according to a fourth step, transmitting a third coded signal from the base station, receiving in the wearable object the third coded signal and retransmitting a scrambled response signal on the basis of the third coded signal received and with an additional modulation of the data particular to the wearable object, and receiving the scrambled response signal from the wearable object in the base station in order to be converted and stored in a second memory register of the digital processing unit,
then analysing the information stored in the first memory register by correlating it with a known PN code in the digital processing unit to determine the flight times of the signals between the base station and the wearable object and deducing therefrom the distance separating the wearable object and the base station, and
analysing the information stored in the second memory register by de-correlating it with the known PN code in order to determine the response transmitted in the scrambled coded response signal if the response code corresponds to the personalised wearable object.

Particular steps of the process are mentioned in dependent claims 2 to 17.

An advantage of the process lies in the fact that communication times or flight times are determined by signals transmitted between the base station and the personalised wearable object. Moreover, it is provided to transmit a scrambled coded response signal at least from the wearable object to the base station. This thus enables the response transmitted directly from the wearable object to be properly defined to distinguish it from other wearable objects in the nearby determination zone. With this determination system, it is possible to accurately measure the distance separating the wearable object from the base station. The wearable object can be configured in the form of a transponder module for the wireless communication of radiofrequency signals.

An advantage of the process lies in the fact that there is a merger of the information of the distance between the base station and the wearable object with the scrambled code response transmitted by the wearable object. This is equivalent to a spatial encryption. The merger of information can also enable the wearable object to be identified.

Advantageously, a first variant of the process for determining a distance is to use a full-duplex communication using two frequencies for transmitting and receiving signals between the base station and the wearable object.

Advantageously, a second variant of the process for determining a distance is to use a single transmission and reception frequency in a half-duplex scheme operating with an alternation between transmission and reception of sequences of signals between the base station and the wearable object.

Advantageously, both variants of the process for determining a distance allow operation with frequency references (typically ±40 ppm) that are not very precise provided that the relative frequency error between the two oscillators only has a very slight adverse effect on the conducted estimation of distance.

All the control work for determining a distance from the wearable object is conducted in a digital signal processing unit in the base station. This greatly simplifies the circuitry of the wearable object, which reduces its cost and also its electric power consumption, as it is supplied by a small dimension battery. Moreover, as the communication link used is narrow band on two communication frequencies or a single communication frequency, which also simplifies the radiofrequency components used.

The system for determining a distance uses a relatively narrow band radiofrequency technology that is simple with ISM bands having good sensitivity. The system has relatively narrow band antennas, which have a higher gain than that of the antennas of a UWB system, which makes the system of the present invention for implementation of the process for determining a distance simpler and more economical than UWB technology. Moreover, the system, which uses ISM bands of communication, allows a transmission of signals at high powers (10 to 20 dBm) in the majority of countries throughout the world, which increases the range of the distance determination system.

For this, the invention also relates to a system for determining a distance for implementation of the process for determining a distance, for which the system comprises a base station and a personalised wearable object for a wireless signal communication with the base station, wherein the base station comprises a transmitter of radiofrequency signals at high frequency, a receiver of radiofrequency signals at high frequency, a processing unit and a local oscillator for clocking the operations of the base station, and the wearable object comprises a transmitter of radiofrequency signals at high frequency, a receiver of radiofrequency signals at high frequency, a logic unit and a local oscillator for clocking the operations of the wearable object.

Particular forms of the system for determining a distance are defined in dependent claims 19 to 25.

BRIEF DESCRIPTION OF THE DRAWINGS

The aims, advantages and characteristics of the process and the system for determining a distance between a personalised wearable object and a base station will become clearer in the following description by the drawings, wherein.

DETAILED DESCRIPTION OF THE INVENTION

In the following description all the components of the system for determining a distance for implementation of the process for determining a distance that are well known to the person skilled in the art in this technical field are only described in a simplified manner. Reference is preferably made to the determination of distance in the field of sport to accurately determine the distance of a person such as an athlete over a zone of activity wearing the wearable object in relation to the position of a base station.

Figure 1:
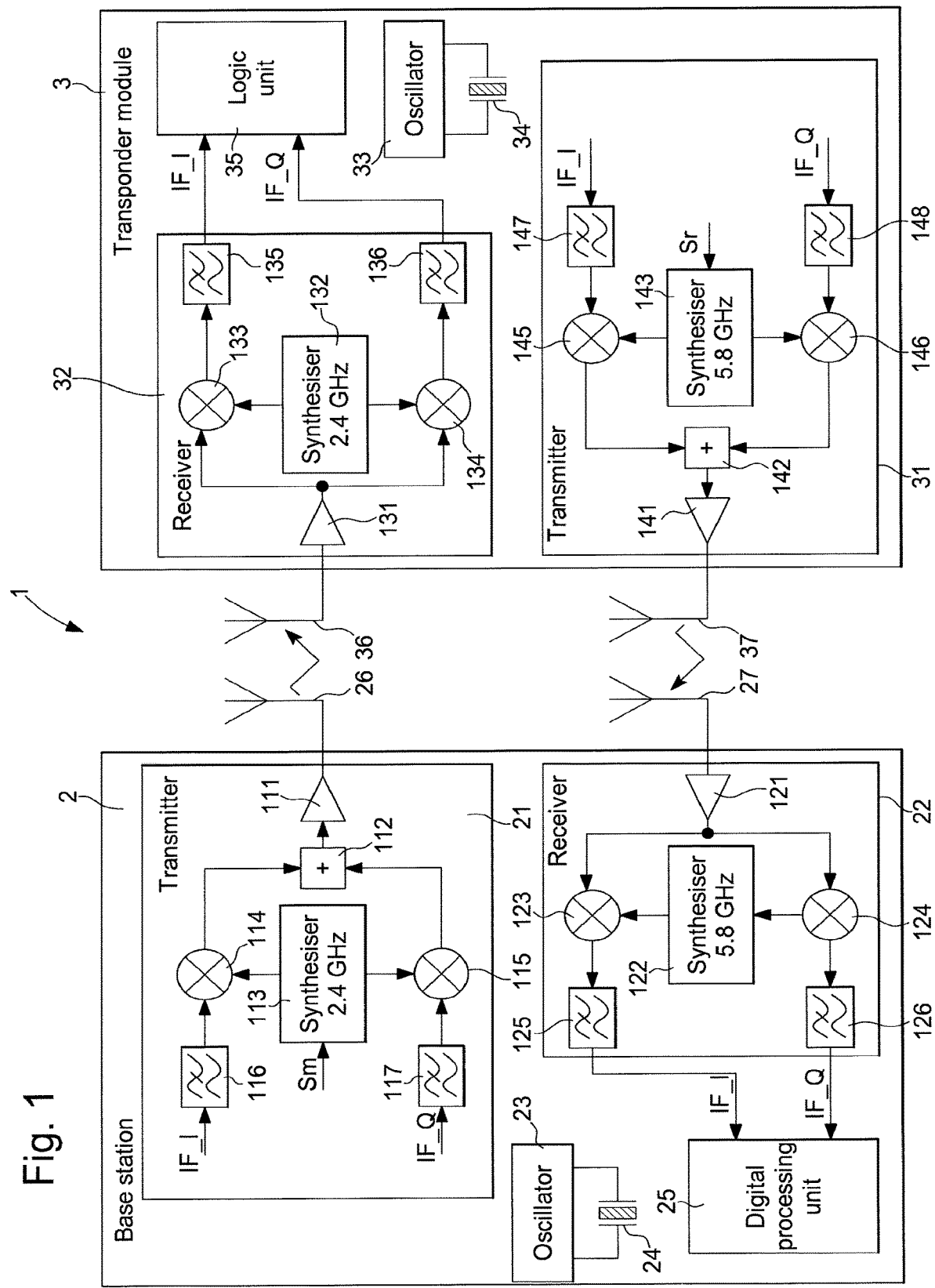
FIG. 1 shows a first practical example of a system for determining a distance for implementation of the process for determining a distance according to the invention.

FIG. 1 shows a first practical example of the system for determining a distance 1 between a wearable object and a base station for implementation of the process for determining a distance. In this first practical example of the system for determining a distance 1, the base station 2 is used on a zone of activity to conduct a wireless communication, in particular by means of radiofrequency signals, with a wearable object 3 worn by a device, which can be a person, for example, an animal or other movable object. The wearable object 3 is preferably a transponder module that can be worn on a part of the body of the person on the sports activity zone, e.g. in an athlete number if the person is a competitor. The base station can be arranged at a reference position of the zone of activity to determine the distance in relation to an intermediate position or a finish position of a track of a sports competition.

According to the process for determining a distance, the distance separating the wearable object, such as the transponder module 3, from the base station 2 must be detected sufficiently accurately. From activation of the transponder module 3, a continuous transmission and reception of radiofrequency command or data signals, which can be coded, is conducted from the base station 2 to the transponder module 3 and vice versa. A merger of the distance information in a coded response signal of the transponder module 3 transmitted to the base station 2 is performed. A digital processing of the signals is primarily performed in the base station 2 to simplify the work of the transponder module 3. The flight times of the signals between the base station and the transponder module and vice versa, and therefore the distance separating them, are thus accurately determined in the base station.

According to the process for determining a distance described in detail with reference to FIG. 2 below, there must at least be a transmission of a base signal for the rolling code or modulation of a pseudo-random noise sequence from the base station 2 to the transponder module 3. The transponder module demodulates this signal and retransmits it on the same carrier frequency or a different carrier frequency of the received signal. The base station 2 then continuously transmits another pseudo-random noise modulation signal so that the transponder module 3 retransmits this signal adding an additional modulation to it. This allows information to be transmitted from the transponder module 3 to the base station 2. It is thus possible to accurately measure at the base station 2 the distance separating it from the transponder module 3 and to receive data particular to this transponder module 3.

The base station 2 comprises in particular a transmitter 21, a receiver 22 and at least one digital processing unit for signals 25, which is connected to the transmitter 21 and to the receiver 22. The processing unit can comprise a microprocessor clocked by a local oscillator 23. This local oscillator 23 is preferably an oscillator with a quartz crystal 24, which can supply an oscillating reference signal at a frequency in the order of 26 MHz, for example.

Following an activation command of the transponder module 3, the transmitter 21 is able to transmit a radiofrequency command or data signal at a first carrier frequency through a first antenna 26 to a first receiver antenna 36 of the transponder module 3 that will be explained in detail below. The first high carrier frequency in this first practical example can be at an ISM frequency at 2.4 GHz, for example. The receiver 22 is able to receive through a second receiver antenna 27 a radiofrequency signal at a second carrier frequency coming from the interrogated transponder module 3. This second high carrier frequency can be at an ISM frequency at 5.8 GHz, for example.

In an initial phase following the activation command performed in the base station 2, a low frequency LF activation signal can firstly be transmitted through the first antenna 26 of the transmitter 21 to wake up the transponder module 3 in a zone of activity. However, it can also be envisaged to wake up the transponder module 3 at high frequency e.g. at 2.4 GHz, or by other ultrasonic signals or others. The wake up of the transponder module 3 can also be conducted in a timed manner at intervals defined according to time bases that can be embedded both in the transponder module 3 and in the base station 2. The different steps of the process following this initial phase are explained in more detail in the following. Said transponder module can also be woken up or activated by an action of the wearer of said transponder module 3.

The transmitter 21 of the base station 2 comprises a first frequency synthesiser 113 receiving a reference signal from the local oscillator 23. The frequency synthesiser 113 is capable of supplying oscillating signals at the first frequency to a first mixer 114 and to a second mixer 115. From the digital processing unit 25, the first mixer 114 receives at least one in-phase intermediate signal IF_I, which is filtered in a low-pass filter 116 for frequency up-conversion of this intermediate signal by a first oscillating signal of the frequency synthesiser. From the digital processing unit 25, the second mixer 115 receives at least one in-quadrature intermediate signal IF_Q, which is filtered in a low-pass filter 117 for frequency up-conversion of this intermediate signal by a second oscillating signal of the frequency synthesiser 113. The output signal at the first frequency of the first mixer 114 and the output signal at the first frequency of the second mixer 115 are added in an adder 112 of the transmitter 21. An output amplifier 111 is connected at output of the adder 112 to amplify the radiofrequency output signal to be transmitted through the first antenna 26.

It should be noted that the first oscillating signal supplied by the first frequency synthesiser 113 of the transmitter 21 is an in-phase oscillating signal, whereas the second oscillating signal is an in-quadrature oscillating signal. This is provided for a respective mixing with the filtered in-phase intermediate signal IF_I and the filtered in-quadrature intermediate signal IF_Q.

Each intermediate signal IF_I and IF_Q, as explained below in reference to FIG. 2 in particular, can comprise a modulation of a synchronisation code to be transmitted through the first antenna 26. This can be an FSK or GFSK frequency modulation or other type for this code. However, it can also be envisaged to modulate the frequency of each oscillating signal supplied by the first synthesiser 113 by a modulation signal Sm transmitted by the digital processing unit 25. A PSK or BPSK phase modulation can also be envisaged.

Figure 2:
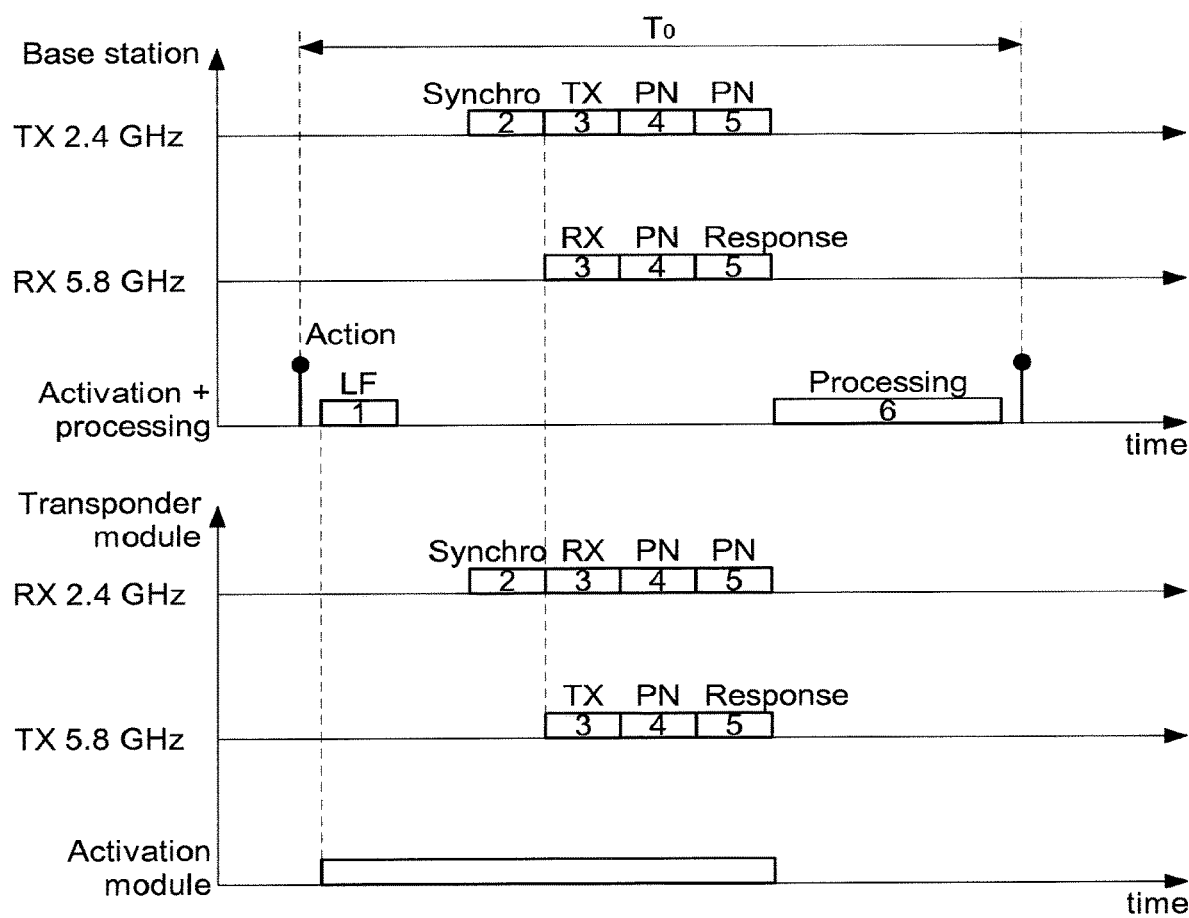
FIG. 2 shows different signals transmitted and received by the base station and by the wearable object of the system for determining a distance of FIG. 1 for the process for determining a distance according to the invention.

It should be noted that a pseudo-random noise generator can be provided in the base station 2, as described in patent EP 2 796 988 B1 with reference to FIG. 2 and paragraphs 33 to 37. This generator can be clocked by the oscillator 23 in order to generate a pseudo-random noise code in connection with the processing unit 25.

The receiver 22 of the base station 2 comprises a second frequency synthesiser 122 to receive a reference signal from the local oscillator 23. A second receiver antenna 27 is provided to receive at least one radiofrequency signal coming from the transponder module 3 interrogated by the base station 2. This second receiver antenna 27 is connected to a low input noise amplifier 121 of the receiver 22 to amplify and filter the received signal or signals. A first mixer 123 of the receiver 22 is provided for frequency conversion of the amplified and filtered radiofrequency signal by an in-phase oscillating signal of the second frequency synthesiser 122 in order to supply an in-phase intermediate signal IF_I, which is filtered by a low-pass filter 125. A second mixer 124 of the receiver 22 is provided for frequency conversion of the amplified and filtered radiofrequency signal by an in-quadrature oscillating signal of the second frequency synthesiser 122 in order to supply an in-quadrature intermediate signal IF_Q, which is filtered by another low-pass filter 126.

The in-phase IF_I and in-quadrature IF_Q intermediate signals supplied by the receiver 22 are received by the digital processing unit 25. In the digital processing unit, there is firstly an ADC analog to digital converter (not shown) to convert the intermediate signals into intermediate digital signals to be processed in the processing unit 25. The processing unit 25 can also comprise (all not shown) an envelope detector of the intermediate digital signals, at least one storage unit such as a multiple register nonvolatile memory, and a digital to analog converter to convert digital signals to be transmitted. The processing unit 25 is clocked by a timing signal supplied by the local oscillator 23, which can be at a frequency in the order of 26 MHz or at a frequency divided by a divider by-two assembly.

The transponder module 3 comprises components similar to those described for the base station 2 except for the digital processing unit. In particular, the transponder module 3 comprises a receiver 32 to receive radiofrequency signals at a first frequency through a first antenna 36, a transmitter 31 to transmit through a second antenna 37 radiofrequency signals at a second frequency to the base station 2, and at least one logic unit 35. The transponder module also comprises a local oscillator 33, which can also be an oscillator with a quartz crystal 34 and which functions in the same manner as the oscillator of the base station 2. This local oscillator 33 is provided to clock all the operations in the transponder module 3.

It should be noted that no digital processing of signals, in particular for accurately determining the distance, is provided in the transponder module 3. On the other hand, it is provided to conduct a simple decoding of the synchronisation signals picked up in the logic unit 35. This synchronisation code enables the transponder module 3 to determine the start of the response phase, during which the data particular to the transponder module 3 are over-modulated on the retransmitted signal.

The receiver 32 of the transponder module 3 therefore comprises a first frequency synthesiser 132 receiving a reference signal from the local oscillator 33. The first receiver antenna 36 is provided to receive at least one radiofrequency signal that has been modulated in frequency, for example, coming from the base station 2. This first receiver antenna 36 is connected to a low input noise amplifier 131 of the receiver 32 to amplify and filter the received signal or signals. A first mixer 133 of the receiver 32 is provided for frequency conversion of the amplified and filtered radiofrequency signal by an in-phase oscillating signal of the first frequency synthesiser 132 in order to supply an in-phase intermediate signal IF_I, which is filtered by a low-pass filter 135. A second mixer 134 of the receiver 32 is provided for frequency conversion of the amplified and filtered radiofrequency signal by an in-quadrature oscillating signal of the first frequency synthesiser 132 in order to supply an in-quadrature intermediate signal IF_Q, which is filtered by another low-pass filter 136.

The in-phase IF_I and in-quadrature IF_Q intermediate signals supplied by the receiver 32 are received by the logic unit 35, which comprises a processor or a finite state machine. The logic unit can also comprise (not shown) an ADC analog to digital converter to convert the intermediate signals into intermediate digital signals, an envelope detector of the intermediate digital signals, a time delay element, a signal frequency modulation generator and at least one storage unit such as a nonvolatile memory. The logic unit 35 also comprises a digital to analog converter to convert digital signals to be transmitted to the base station 2. The logic unit 35 is clocked by a timing signal supplied by the quartz crystal 34 local oscillator 33. The frequency of the oscillator 33 can be in the order of 26 MHz or at a frequency divided by a divider by-two assembly.

The digital processing is simplified in the transponder module since all the digital processing for determining the flight time of the signals is primarily conducted in the processing unit 25 of the base station 2. The transponder module 3 only performs a simplified processing of the signals to enable it to synchronise the response phase by over-modulation.

The transmitter 31 of the transponder module 3 comprises a second frequency synthesiser 143 to firstly receive a reference signal from the local oscillator 33. The second frequency synthesiser 143 is able to supply oscillating signals at a second frequency to a first mixer 145 and to a second mixer 146. From the logic unit 35, the first mixer 145 receives at least one in-phase intermediate signal which is filtered in a low-pass filter 147 for frequency up-conversion of this intermediate signal by a first in-phase oscillating signal of the second frequency synthesiser 143. The second mixer 146 receives from the logic unit 35 at least one in-quadrature intermediate signal IF_Q, which is filtered in a low-pass filter 148 for frequency up-conversion of this intermediate signal by a second in-quadrature oscillating signal of the second frequency synthesiser 143. The output signal at a second frequency of the first mixer 145 and the output signal at a second frequency of the second mixer 146 are added in an adder 142 of the transmitter 31. An output amplifier 141 is connected at output of the adder 142 to amplify the radiofrequency output signal to be transmitted through a second antenna 37 of the transponder module 3.

It should be noted that the use in the unit 35 of an analog to digital conversion followed by a digital filtering operation, then a digital to analog conversion prevents the out of band retransmission of any possible interference. In fact, any frequency that is too high present on the output signals IF_I, IF_Q of the block 32 of FIGS. 1 and 3 will be automatically be folded into filtered band before retransmission.

It should firstly be noted that the quartz crystal 24 local oscillator 23 of the base station 2 is similar to the quartz crystal 34 local oscillator 33 of the transponder module 3. Therefore, the oscillation frequency is substantially similar to ±40 ppm. This can permit a good processing synchronisation in the base station 2 and in the transponder module 3. According to the first variant, a phase of the process can be provided to adjust one of the oscillators in relation to the other oscillator, as explained below in reference to FIG. 2.

It should be noted that for each variant of the system for distance determination, several commutated antennas are also conceivable, thus allowing over the course of several successive phases of operation of the system on different antennas a topology of diverse antennas to be used that is well known to the person skilled in the art.

It should also be noted that a single frequency synthesiser can be provided for the generation of oscillating signals at two carrier frequencies for transmitting and receiving signals. Moreover, the modulation of the data or commands can be an FSK, GFSK, PSK, QPSK or OQPSK modulation without limitation to enable the distance measurement to be performed.

For transmission of a response code at the end of the process for determining a distance from the transponder module, a scramble modulation command Sr can be transmitted from the logic unit 35 to the frequency synthesiser 143. However, a modulation can also be envisaged directly for the intermediate signals IF_I and IF_Q supplied to the two mixers 145, 146 of the second frequency synthesiser 143 of the transmitter 31.

The process for determining a distance between a base station 2 and a personalised transponder module 3 will now be described with reference to FIG. 2. According to the first practical example of the system for determining a distance described above, a transmission of a synchronisation signal from the base station 2 to the transponder module 3 must at least be conducted after activation of the transponder module. The activated transponder module 3 receives this first synchronisation signal from the base station 2 to demodulate said signal and synchronise its response phase. After the exchange of different signals with the transponder module, the processing unit of the base station 2 is able to accurately determine the flight time of the signals between the two entities, and thus the real distance separating them.

It should be noted that the transmitter of the transponder module 3 can be set in operation after receiving the first synchronisation signal from the base station 2. However, it is also conceivable that the activation of the transmitter can be conducted by an action of the wearer of the transponder module 3 or following a determined action that can be programmed, or following a detection of movement.

Principally, according to the first practical example of the system for determining a distance for implementation of the process for determining a distance, the transponder module can be activated directly by the action of a button or a touch on the transponder module. The transponder module transmits an interrogation signal with modulation, e.g. FSK or PSK, at a second frequency with a data transfer rate of 50 kbits/s, for example, to the base station to start the process for determining a distance. This second frequency can be selected at 5.8 GHz. However, as shown in FIG. 2, an activation of the transponder module 3 can be conducted by transmitting a low frequency LF wake up signal 1 from the base station 2 in a first step or phase of the process. However, the wake up of the transponder module can also be conducted by a manual action on a button of the module or by time synchronisation with the base station. Following the wake up of the transponder module and after a determined time interval, the base station transmits a first synchronisation signal 2 at a first high frequency from the transmitter to the receiver of the transponder module in a second step or phase of the process. The first high frequency of the transmitter can be selected at 2.4 GHz.

The first synchronisation signal 2 transmitted by the base station for the transponder module is a coded base modulation signal, e.g. FSK or GFSK. The transponder module receives this synchronisation signal in order to demodulate it and synchronise its response phase. From this instant, the transponder module sets its transmitter in operation for a transmission of signals at a second high frequency in the order of 5.8 GHz.

In a third step or phase of the process, the transmitter of the base station transmits through the first antenna a solely carrier frequency signal TX 3, which is at a first frequency at 2.4 GHz, for example. This carrier frequency signal TX 3 is received by the receiver of the transponder module, which acts as a transfer device and frequency change of the received carrier frequency signal RX 3 (as "transverter"). On reception of this carrier frequency signal RX 3, a conversion to a second frequency is performed directly in the transponder module for the transmission of a carrier frequency signal TX 3 from the transponder module, which is at a second frequency of 5.8 GHz, for example. This received signal RX 3 at a second carrier frequency is converted in the base station to be stored in a first register of the nonvolatile memory.

The transmission and reception of signals are conducted in parallel and continuously in the base station and in the transponder module. This third step of the process is useful to correct the frequency difference of the quartz crystal oscillators of the base station and the transponder module.

In a fourth step or phase of the process directly after the carrier frequency signal of the third step, the transmitter of the base station transmits a coded modulation signal, e.g. PSK or FSK, which is a pseudo-random noise signal PN 4. This signal PN 4 is transferred at high rate, e.g. 125 Mbits/s, and filtered to comply with the standards of the frequency band used. The transponder module receives this signal PN 4 at the first high frequency of 2.4 GHz in order to retransmit this signal PN 4 converted to the second high frequency of 5.8 GHz for the base station. A time shift can be added during the transmission of the coded signal from the transponder module.

The transmission and reception of the signal PN 4 are conducted in parallel in the base station and in the transponder module. Once the signal PN 4 from the transponder module is received, the base station converts the frequency of this signal and stores it in a second register of the nonvolatile memory.

In a fifth step or phase of the process, the transmitter of the base station directly and once again transmits the signal PN transmitted in the fourth step, which is a coded modulation signal, e.g. PSK or FSK, such as a pseudo-random noise signal PN 5. This signal PN 5 is also at high rate, e.g. 125 Mbits/s, and filtered to comply with the standards of the frequency band used. The transponder module receives this signal PN 5 at the first high frequency of 2.4 GHz in order to retransmit it at around 5.8 GHz and with a further additional modulation, e.g. at 50 kbits/s, over the local oscillator or over the retransmission period or any other modulating parameter. The transponder module thus generates a response signal, which takes into account this signal PN 5 and the data particular to the transponder module, and transmits this scrambled response signal with the modulation, e.g. at 50 kbits/s, on the second frequency at 5.8 GHz. A time shift can be added during the transmission of the scrambled coded response signal of the transponder module. The response signal can also contain an identification code of said transponder module or different parameters measured by sensors such as temperature, atmospheric pressure, speed or acceleration of the person wearing said transponder module.

The transmission and reception of the signal PN 5 and response code 5 are conducted in parallel in the base station and in the transponder module. The base station thus receives the coded response signal from the transponder module at the frequency of 5.8 GHz and conducts a frequency conversion in order to store this information in a third register of the nonvolatile memory of the processing unit.

At the end of the fifth step or phase of the process, the transponder module moves into a resting or standby mode. From this instant, a digital processing of the information obtained during preceding phases and stored in the different registers of the memory is conducted in the sixth step or phase of the process. All the processing of the captured information is conducted in the digital processing unit of the base station.

Firstly, the digital processing unit of the base station analyses the information stored in the first register of the memory and by means of a fast Fourier transform FFT determines the frequency error between the two quartz crystal oscillators of the base station and the transponder module. However, the frequency alignment between the time base of the transponder module and that of the base station can also be performed directly in the transponder module.

The digital processing unit subsequently analyses the information stored in the second register of the memory correlating it with the known PN code around the corrected frequency of the oscillators during the analysis of the first register of the memory. The result of this correlation directly gives the flight times between the base station and the transponder module and between the transponder module and the base station. Different transition times of the modulator, the receiver, filtering and other operations in the electronic components of the two parts are also taken into account. However, these transition times are generally calibrated after manufacture of the electronic circuits of the base station and the transponder module and are compensated.

It should be noted that the distance separating the transponder module from the base station is also determined on the basis of knowledge of the flight times.

Finally, the digital processing unit of the base station analyses the information stored in the third register of the memory by de-correlating it with the known PN code, which is shifted from the correlation time obtained during the analysis of the information stored in the second register of the memory. This final operation enables recovery of the frequency modulated carrier wave with the coded response signal transmitted by the transponder module during the fifth step of the process. A demodulation of the over-modulated signal, e.g. by FSK, ASK, PSK or any other type of modulation, then allows the response code transmitted by the transponder module to be retrieved. The transponder module is thus fully recognised, which also allows the person wearing it to be known from several other transponder modules likely to be interrogated at the same time.

It should also be noted that the time of each phase of the process during the transmission and reception of the different signals can be in the order of 1 ms or even less. This duration defines the demodulation band width and therefore the sensitivity of the system, i.e. the maximum effective range. The total duration $T_O$ from the activation of the transponder module to the complete processing of the information stored in the base station can be in the order of 10 ms.

Figure 3:
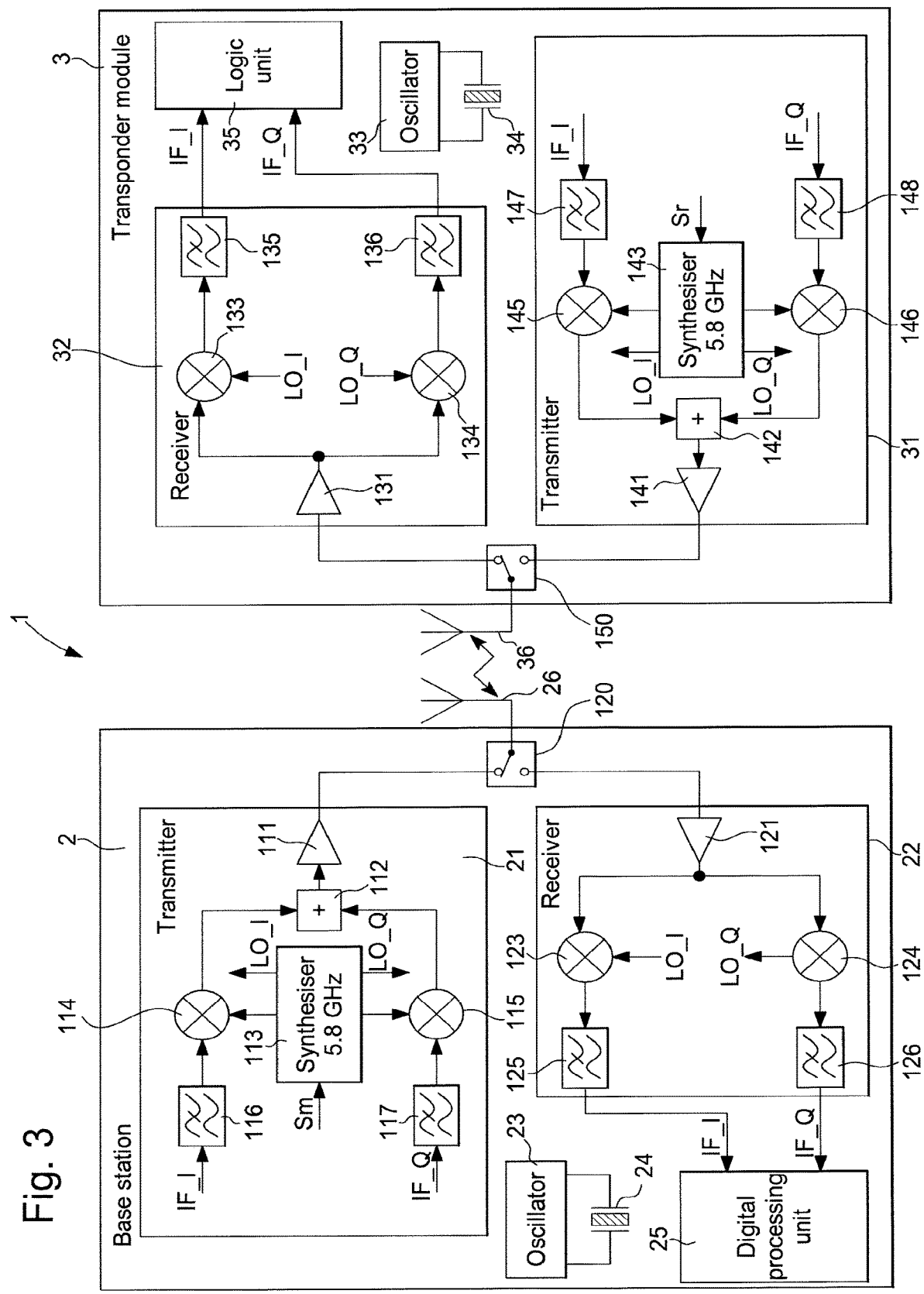
FIG. 3 shows a second practical example of a system for determining a distance for implementation of the process for determining a distance according to the invention.

FIG. 3 shows a second practical example of the system for determining a distance 1 for implementation of the process for determining a distance. Even though the transmission and reception of signals between the base station 2 and the transponder module 3 occur at a single carrier frequency with alternation of transmission and reception of signals, the different components of the base station 2 and the transponder module 3 are similar to those described with reference to FIG. 1. Therefore, for simplification the same components described in reference to FIG. 1 will not be described again, and only the different parts of this system for determining a distance of FIG. 3 will be described.

In the case of this second practical example of the system for determining a distance 1 for implementation of the process for determining a distance, both the transmission and reception are conducted through the same antenna and at a single carrier frequency, which can be selected at 5.8 GHz, for example. An alternation between transmission and reception is performed in the base station 2 and in the transponder module 3.

There is only one frequency synthesiser 113 in the base station 2 to generate in-phase and in-quadrature oscillating signals at a frequency close to 5.8 GHz for the mixers. In the transmitter 21, the frequency synthesiser 113 supplies an in-phase oscillating signal to the first mixer 114 to raise the frequency of the in-phase intermediate signal IF_I to be transmitted. The frequency synthesiser 113 supplies an in-quadrature oscillating signal to the second mixer 115 to raise the frequency of the in-quadrature intermediate signal IF_Q to be transmitted. The output signals of the two mixers are added in the adder 112 before being amplified by the amplifier 111, the output of which is connected to a switching element 120 connected to the single antenna 26 for the transmission and reception of signals. In accordance with a command for switchover of transmission to the switching element 120 in particular by the processing unit 25, there is a transmission of a signal supplied by the transmitter through the antenna 26 in the transmission mode. This switching element 120 is preferably a multiplexer with two inputs and one output with a switching command coming from the processing unit 25 clocked by a timing signal coming from the local oscillator 23.

The frequency synthesiser 113 also supplies an in-phase oscillating signal LO_I for the first mixer 123 of the receiver 22 and an in-quadrature oscillating signal LO_Q for the second mixer 124 of the receiver 22. In accordance with a command for switchover of reception to the switching element 120, the signal picked up by the antenna 26 in the receiving mode is amplified by the low-noise amplifier 121 before being supplied to the first and second mixers of the receiver for lowering the frequency of the received signal and supplying the filtered and transmitted in-phase IF_I and in-quadrature IF_Q intermediate signals to the processing unit 25.

In the transponder module 3, there is also only one frequency synthesiser 143 to generate in-phase and in-quadrature oscillating signals at a frequency close to 5.8 GHz for the mixers. In the transmitter 31, the frequency synthesiser 143 supplies an in-phase oscillating signal to the first mixer 145 to raise the frequency of the in-phase intermediate signal IF_I to be transmitted. The frequency synthesiser 143 supplies an in-quadrature oscillating signal to the second mixer 146 to raise the frequency of the in-quadrature intermediate signal IF_Q to be transmitted. The output signals of the two mixers are added in the adder 142 before being amplified by the amplifier 141, the output of which is connected to a switching element 150 connected to the single antenna 36 for the transmission and reception of signals. In accordance with a command for switchover of transmission to the switching element 150 in particular by the logic unit 35, there is a transmission of a signal supplied by the transmitter 31 through the antenna 36 in the transmission mode. This switching element 150 is preferably a multiplexer with two inputs and one output with a switching command coming from the logic unit 35 clocked by a timing signal coming from the local oscillator 33.

The frequency synthesiser 143 also supplies an in-phase oscillating signal LO_I for the first mixer 133 of the receiver 32 and an in-quadrature oscillating signal LO_Q for the second mixer 134 of the receiver 32. In accordance with a command for switchover of reception to the switching element 150, the signal picked up by the antenna 36 in the receiving mode is amplified by the low-noise amplifier 131 before being supplied to the first and second mixers of the receiver 32 for lowering the frequency of the received signal and supplying the filtered and transmitted in-phase IF_I and in-quadrature IF_Q intermediate signals to the logic unit 35.

It should also be noted that two frequency synthesisers can also be provided respectively for the transmitter and the receiver of each entity, even through the oscillating signals generated are at the same carrier frequency for the transmission and reception of signals. Moreover, the modulation of the data or commands can be, for example, an FSK, GFSK, PSK, QPSK, OQPSK or other modulation without limitation to enable the distance measurement to be performed.

Figure 4:
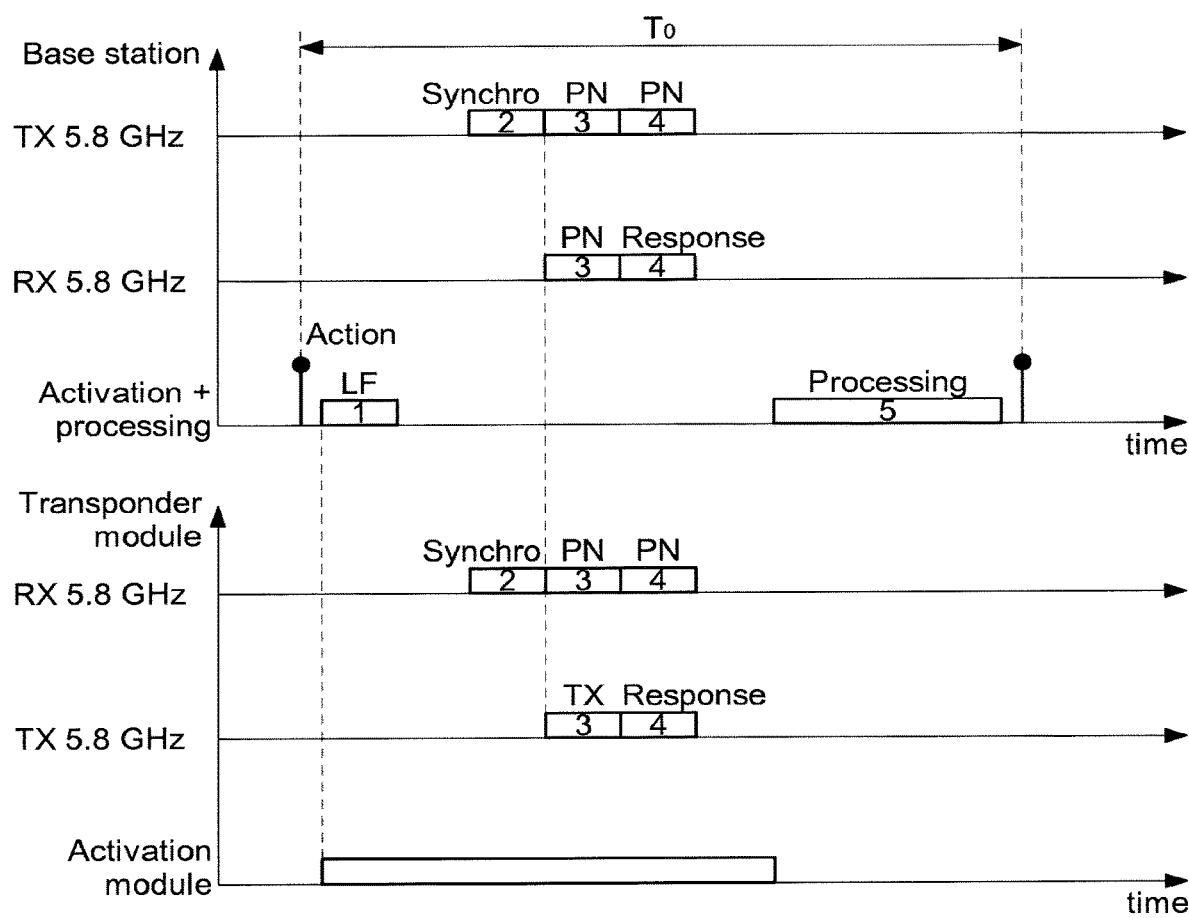
FIG. 4 shows different signals transmitted and received by the base station and by the wearable object of the system for determining a distance of FIG. 3 for the process for determining a distance according to the invention.

The process for determining a distance between a base station 2 and a personalised transponder module 3 will now be described with reference to FIG. 4. According to the second practical example of the system for determining a distance described above, the process for determining a distance has only one step or phase less than the process described above with respect to the first practical example of the system for determining a distance of FIG. 1. The first, second, fourth, fifth and sixth steps or phases described above are repeated for this process for determining a distance in the second practical example of the system for determining a distance. In contrast, the third step or phase of transmission of a carrier frequency signal for determining a frequency error between the two oscillators is omitted. In this scenario with the transmission and reception at a single carrier frequency, e.g. at 5.8 GHz, the frequency error becomes irrelevant.

A single antenna in the base station and in the transponder module is used for the transmission and reception of the coded signals with a single communication frequency at 5.8 GHz. In these conditions, there must be an alternation between transmission and reception in the transponder module and in the base station of the coded signals. Time windows or time intervals for transmission and for reception alternate over time, which means the reception of a signal coming from the base station or the transponder module can occur over a portion of each receiving window. The alternation between transmission and reception occurs at high speed, every 500 ns, for example, in particular in the base station, as can be seen symbolically in FIG. 5.

Figure 5:
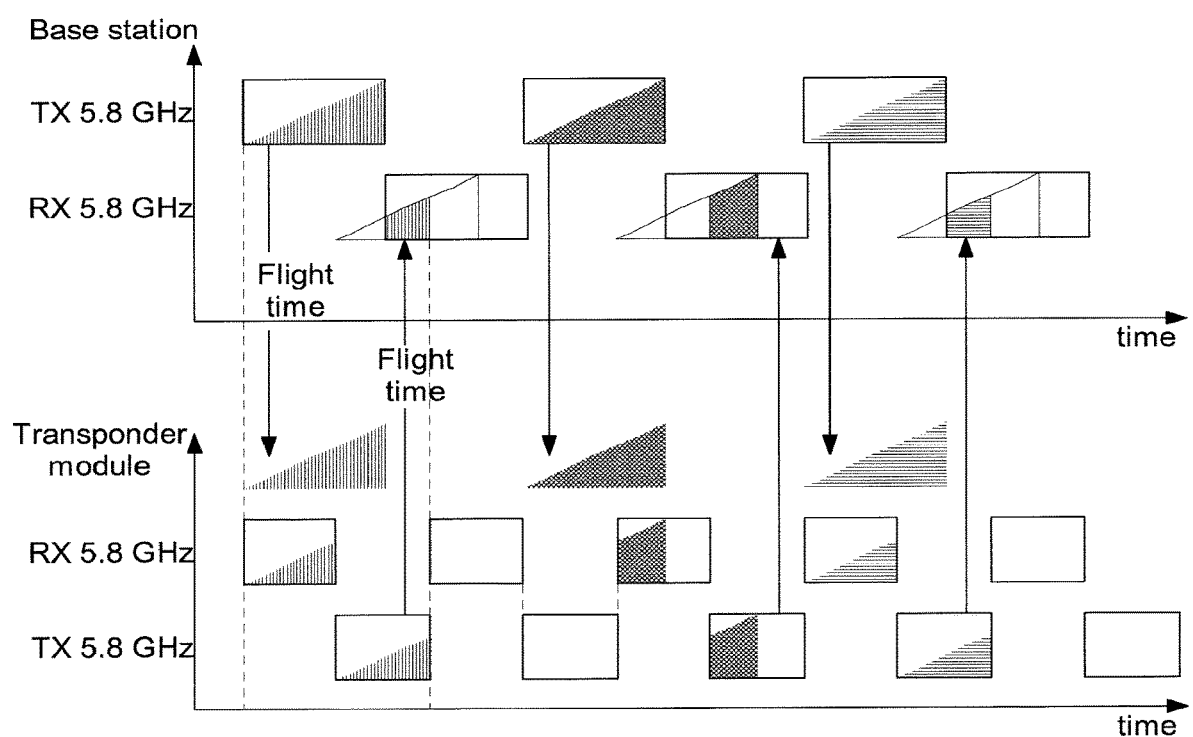
FIG. 5 shows sequences of the transmission and reception of signals, which alternate in time between the base station and the wearable object of the system for determining a distance of FIG. 3 for the process for determining a distance according to the invention.

Time intervals can be provided for the transmission and reception of coded signals of different duration in the transponder module in relation to the base station, as shown in FIG. 5. However, a transmission duration equal to a reception duration is defined in the base station and in the transponder module. Because of this, there is a time shift between transmission and reception in the transponder module in relation to the base station.

As shown symbolically in FIG. 5, triangles are shown to represent the transmission and reception of sequences of signals over time. It can be seen that, as the transmission and reception time windows are shifted between the base station and the transponder module, a portion of the transmission of the base station can be received by the transponder module and equally a portion of the transmission of the transponder module can be received by the base station. Each window can be a duration in the order of 500 ns for the base station, whereas for the transponder module each window can be in the order of 350 ns, for example. In contrast, the flight time determined between the transponder module and the base station is a few ns.

It should also be noted that to obtain long sequences that overlap sufficiently between a transmitted sequence and a received sequence, the transponder module must provide a defined and well known internal signal delay. It must also be noted that the transmission and reception sequences of the transponder module and the base station must be synchronised or must have a different frequency to prevent a parasitic desynchronisation. The base station and the transponder module are in the transmission and reception modes at the same time, as evident in FIG. 5.

Even through only a portion of the signal is received by the base station, for example, for analysis, the correlation will easily recognise the flight times, for example. The loss of a part of the signal by overlap of the transmission/reception intervals only impacts the sensitivity, i.e. the range of the system. 70% of lost signal reduces the sensitivity by 10 dB.

Figure 6:
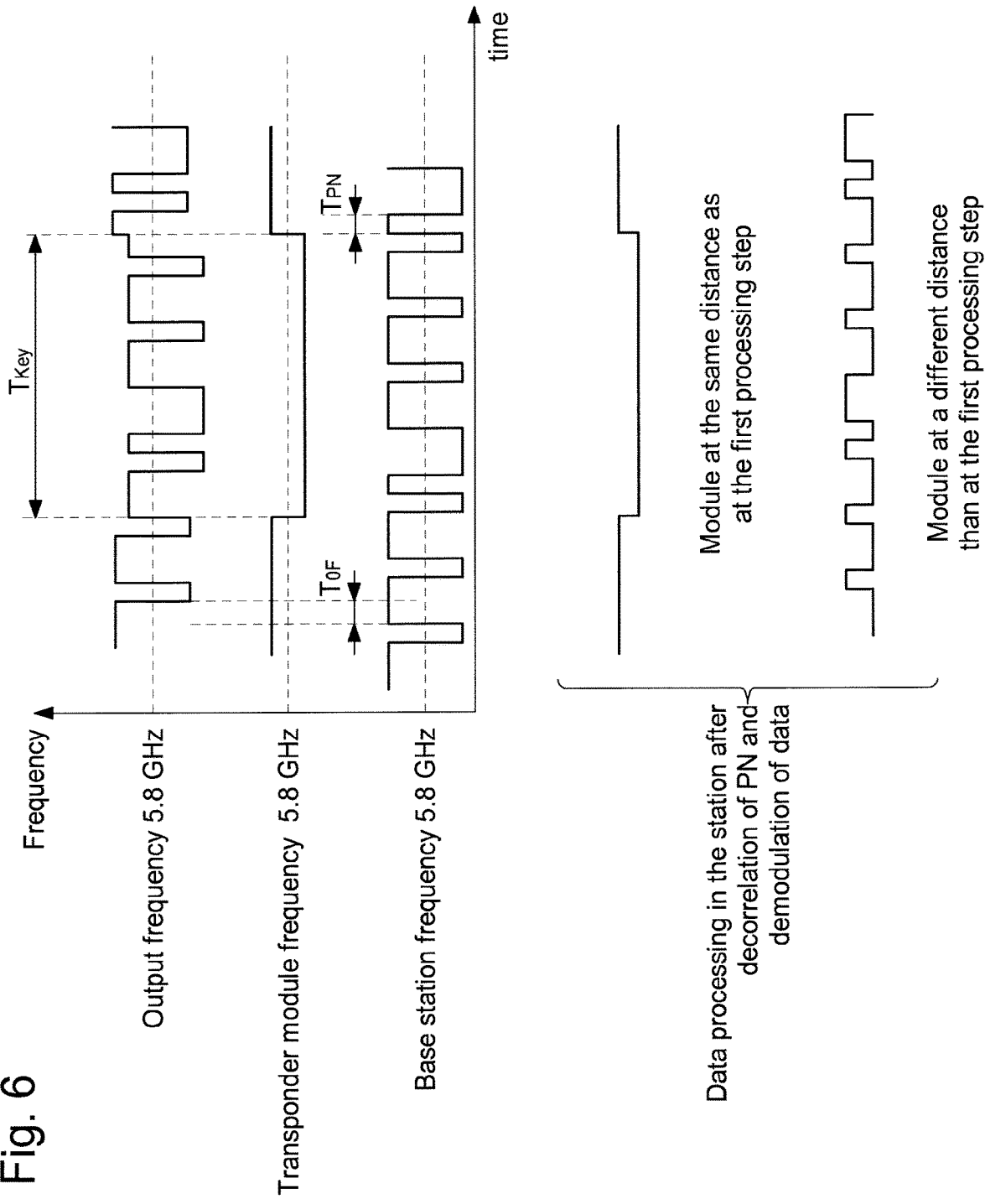
FIG. 6 in a particular modulation case, shows the frequency over time of transmitted and retransmitted coded signals from the base station to the wearable object and from the wearable object to the base station during the response phase of the transponder module and as a function of the distance between the wearable object and the base station for the process for determining a distance according to the invention.

The operation of over-modulation by the transponder module to transmit its own message is illustrated in FIG. 6 in the case of an over-modulation in frequency on a PN signal that is also modulated in frequency. Evident here is the variation in frequency of the scrambled coded signal transmitted by the transponder module on the basis of the PN code received by the base station with a time difference $T_{OF}$ that is the flight time between the transponder module and the base station. The first signal from the top of the graph of the frequency in relation to the time shows the coded response signal of the transponder module. In this example, this response signal combines the received PN coded signal at 13 Mbits/s and converted to 5.8 GHz with a FSK modulation at 1 Mbits/s on the local oscillator to give a scrambled coded response signal. Evident on this first signal is the frequency variation of the response signal of the transponder module to define a bit at state "1" followed by a bit at state "0" and followed further by a bit at state "1" at 1 Mbits/s on the converted PN signal. The second signal below shows only the change of data bit at 1 Mbits/s, whereas the third signal is the signal received by the base station shifted in the time of duration $T_{OF}$. The duration $T_{Key}$ of each bit is in the order of 1 μs for a transfer rate at 1 Mbits/s on the local oscillator, whereas the duration $T_{PN}$ of a variation of the PN code at 13 Mbits/s is in the order of 80 ns.

As explained above, there is a merger between the response to the scrambled code of the transponder module with the calculated distance information. Such a coded response can be decoupled intelligently. This second action is simply done via the modulation of the central carrier wave to be retransmitted from the transponder module, as shown in FIG. 6, during this second step, which directly follows the distance estimation. The modulation can be conducted in any manner whatsoever (frequency, phase, amplitude, retransmission period . . . ). As far as the base station is concerned, DSP digital processing uses the exact PN phase determined in the second step in order to de-convolute the transverse response wave according to the first variant described or the reflected response wave according to the second variant. The modulated PN code acts as a scrambling code, which only leads to a correct descrambling, when the preceding detected distance is equal to that of the transponder module itself where the response of the transponder module has been calculated.

On the basis of the description outlined above, several variants of the process and system for determining a distance between a base station and a wearable object can be conceived by the person skilled in the art without departing from the framework of the invention defined by the claims.

What is claimed is:

1. A method for determining a distance between a personalised wearable object and at least one base station by a wireless signal communication, wherein the base station includes a transmitter of radiofrequency signals at high frequency, a receiver of radiofrequency signals at high frequency, processing circuitry and a local oscillator for clocking operations of the base station, and the wearable object includes a transmitter of radiofrequency signals at high frequency, a receiver of radiofrequency signals at high frequency, a logic circuit and a local oscillator for clocking operations of the wearable object, comprising:

activating the wearable object;

transmitting a first coded synchronisation signal from the base station;

receiving the first synchronisation signal from the base station in the wearable object to synchronise modulation of data particular to the wearable object in a subsequent response signal;

transmitting a second coded signal from the base station;

receiving the second coded signal from the base station in the wearable object;

retransmitting the received second coded signal to the base station;

receiving the retransmitted second coded signal from the wearable object in the base station in order to be converted and stored in a first memory register of the processing circuitry;

transmitting a third coded signal from the base station;

receiving in the wearable object the third coded signal;

retransmitting a scrambled response signal on the basis of the third coded signal received and with the modulation of the data particular to the wearable object;

receiving the scrambled response signal from the wearable object in the base station in order to be converted and stored in a second memory register of the processing circuitry;

then analysing information stored in the first memory register by correlating the stored information with a known PN code in the processing circuitry to determine flight times of the signals between the base station and the wearable object and deducing therefrom the distance separating the wearable object and the base station; and analysing information stored in the second memory register by de-correlating the stored information with the known PN code in order to determine a response transmitted in the scrambled coded response signal if a response code corresponds to the personalised wearable object.

2. The method for determining a distance according to claim 1, wherein the wearable object is deactivated at an end of the transmission of the scrambled coded response signal.

3. The method for determining a distance according to claim 1, wherein the transmitter of the wearable object is set in operation following the reception of the first coded signal from the base station or following an action of a wearer of the wearable object or following a determined action, or according to a time synchronisation established and synchronised periodically between the wearable object, which is a transponder module and the base station.

4. The method for determining a distance according to claim 1, wherein the base station transmits the first synchronisation signal with a determined time interval after the activation of the wearable Object, wherein said first synchronisation signal received by the wearable object allows the response signal to be prepared and the transmitter of the wearable object to be set in operation.

5. The method for determining a distance according to claim 1, wherein the base station transmits in succession: the second coded signal and the third coded signal, which are a second pseudo-random noise code signal and a third pseudo-random noise code signal.

6. The method for determining a distance according to claim 1, wherein the transmitter of the base station transmits in succession: a determined time interval after activation of the wearable object, the first synchronisation signal followed by a codeless carrier frequency signal, followed by the second coded signal, which is a pseudo-random noise code signal, followed by the third coded signal, which is a same pseudo-random noise code signal, and wherein the receiver of the wearable object receives in succession: the first coded signal, the carrier frequency signal and the pseudo-random noise code signals to retransmit these signals processed in the logic circuit to the base station.

7. The method for determining a distance according to claim 6, wherein the carrier frequency signal received from the base station by the receiver of the wearable object is retransmitted by the transmitter of the wearable object for the base station in order to be converted and stored in a third memory register of the digital processing unit.

8. The method for determining a distance according to claim 7, for which the local oscillator of the base station is an oscillator with a quartz crystal and for which the local oscillator of the wearable object is an oscillator with quartz crystal similar to the oscillator with the quartz crystal of the base station, wherein the information stored in the third memory register of the digital processing unit is analysed to determine the frequency error between the two oscillators to be taken into account for determination of the flight time of the signals between the base station and the wearable object.

9. The method for determining a distance according to claim 6, wherein the transmitter of the base station transmits the signals at a first high frequency at a high transfer rate, and wherein the transmitter of the wearable object transmits the signals at a second high frequency different from the first high frequency.

10. The method for determining a distance according to claim 9, wherein the first high frequency is at a value in the order of 2.4 GHz, wherein the high transfer rate of the signals of the base station is in the order of 125 Mbits/s, wherein the second high frequency is at a value in the order of 5.8 GHz, wherein a rate of the modulation in the coded response signal is in the order of 50 kbits/s.

11. The method for determining a distance according to claim 6, wherein the transmission and reception of the coded signals in the base station and the wearable object are conducted continuously in succession, wherein a duration of each phase of transmission and reception of signals is equal in the base station and the wearable object.

12. The method for determining a distance according to claim 1, wherein the transmitter of the base station transmits in succession: a determined time interval after activation of the wearable object, the first coded synchronisation signal followed by the second coded signal, which is a pseudo-random noise code signal, followed by the third coded signal, which is a same pseudo-random noise code signal, and wherein the receiver of the wearable object receives in succession: the first coded signal, the carrier frequency signal and the pseudo-random noise code signals to retransmit these signals processed in the logic circuit to the base station.

13. The method for determining a distance according to claim 12, wherein transmitter and the receiver of the base station and the transmitter and the receiver of the wearable object transmit and receive the signals at a single high frequency through an antenna of the base station and an antenna of the wearable object.

14. The method for determining a distance according to claim 12, wherein the high frequency is at a value in the order of 5.8 GHz, wherein a high transfer rate of the signals from the base station is in the order of 125 Mbits/s, and wherein a rate of the modulation in the coded response signal is in the order of 50 kbits/s.

15. The method for determining a distance according to claim 12, wherein a switchover of transmission and reception of signals through the antenna of the base station and the antenna of the wearable object is conducted to have an alternation between transmission and reception of sequences of the signals transmitted and received between the base station and the wearable object.

16. The method for determining a distance according to claim 14, wherein a duration of transmission of signals and a duration of reception of signals from the base station are equal, and wherein a duration of transmission of signals and a duration of reception of signal from the wearable object are equal.

17. The method for determining a distance according to claim 15, wherein the duration of transmission and reception of signals from the base station is more than the duration of transmission and reception of signals from the wearable object, but less than the duration of each phase of transmission from the base station or reception by the wearable object of the first, second and third coded signals.

18. A system for determining a distance for implementation of the process for determining a distance, the system, comprising:

a base station, and a personalised wearable object for a wireless signal communication with the base station, wherein the base station includes a transmitter of radiofrequency signals at high frequency, a receiver of radiofrequency signals at high frequency, processing circuitry and a local oscillator for clocking operations of the base station, and wherein the wearable object including a transmitter of raciofrequency signals at high frequency, a receiver of raciofrequency signals at high frequency, logic circuitry and a local oscillator for clocking operations of the wearable object, wherein the processing circuitry is configured to:
control transmission of a first synchronization signal from the base station;
control transmission of a second coded signal from the base station;
control reception of a retransmitted second coded signal from the wearable object at the base station;
convert and store the retransmitted second coded signal in a first memory register of the processing circuitry;
control transmission of a third coded signal from the base station;
control reception of a scrambled response signal from the wearable object at the base station;
convert and store the scrambled response signal in a second memory register of the processing circuitry;
analyze information stored in the first memory register by correlating the stored information with a known PN code in the processing circuitry to determine flight times of the signals between the base station and the wearable object and deducing therefrom the distance separating the wearable object and the base station; and
analyze information stored in the second memory register by de-correlating the stored information with the known PN code in order to determine a response transmitted in the scrambled coded response signal if a response code corresponds to the personalized wearable object.

19. The system for determining a distance according to claim 18, wherein the local oscillator of the base station is an oscillator with a quartz crystal and for which the local oscillator of the wearable object is an oscillator with a quartz crystal similar to the oscillator with the quartz crystal of the base station.

20. The system for determining a distance according to claim 18, wherein the transmitter of the base station is connected to a first antenna for the transmission of signals at a first high frequency, wherein the receiver of the base station is connected to a second antenna for the reception of signals at a second frequency, wherein the receiver of the wearable object is connected to a first antenna for the reception of signals at a first high frequency, and wherein the transmitter of the wearable object is connected to a second antenna for the transmission of signals at the second high frequency.

21. The system for determining a distance according to claim 20, wherein the first high frequency is in the order of 2.4 GHz, and wherein the second high frequency is in the order of 5.8 GHz.

22. The system for determining a distance according to claim 18, wherein the transmitter and the receiver of the base station are connected by means of a switching element in the form of multiplexer with a single antenna for the transmission and reception of signals at a high frequency, and wherein the transmitter and the receiver of the wearable object are connected by means of a switching element in the form of a multiplexer with a single antenna for the transmission and reception of signals at the same high frequency.

23. The system for determining a distance according to claim 22, wherein the high frequency is in the order of 5.8 GHz.

24. The system for determining a distance according to claim 18, wherein the base station is arranged on a zone of activity, and wherein the wearable object is a transponder module capable of being worn by a person in the zone of activity, wherein the transponder module can be activated by manually acting on a button or a touch of the module or activated by a low-frequency wake-up signal transmitted by the base station, or can also be activated periodically on the basis of a defined and synchronised interval between the base station and the transponder module.

25. The system for determining a distance according to claim 18, comprising a processing of signals at intermediate frequency proceeding to a first analog to digital conversion followed h a digital filtering operation, then a second digital to analog conversion, to prevent an out of band interference signal from being retransmitted.

* * * * *

UNITED STATES PATENT AND TRADEMARK OFFICE
CERTIFICATE OF CORRECTION

PATENT NO. : 10,690,765 B2
APPLICATION NO. : 15/710238
DATED : June 23, 2020
INVENTOR(S) : Arnaud Casagrande et al.

It is certified that error appears in the above-identified patent and that said Letters Patent is hereby corrected as shown below:

In the Claims

In Column 16, Line 54, Claim 18, delete "system," and insert -- system --, therefor;

In Column 16, Line 64, Claim 18, delete "raciofrequency" and insert -- radiofrequency --, therefor;

In Column 16, Line 65, Claim 18, delete "raciofrequency" and insert -- radiofrequency --, therefor.

Signed and Sealed this
Twenty-ninth Day of September, 2020

Andrei Iancu
*Director of the United States Patent and Trademark Office*